US011408316B2

(12) United States Patent
Srinivasan

(10) Patent No.: US 11,408,316 B2
(45) Date of Patent: Aug. 9, 2022

(54) DEDICATED THERMAL MANAGEMENT FOR AN SCR SYSTEM

(71) Applicant: Cummins Emission Solutions Inc., Columbus, IN (US)

(72) Inventor: Sriram Srinivasan, Greenwood, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 149 days.

(21) Appl. No.: 16/772,047

(22) PCT Filed: Dec. 18, 2017

(86) PCT No.: PCT/US2017/067081
§ 371 (c)(1),
(2) Date: Jun. 11, 2020

(87) PCT Pub. No.: WO2019/125380
PCT Pub. Date: Jun. 27, 2019

(65) Prior Publication Data
US 2020/0362739 A1  Nov. 19, 2020

(51) Int. Cl.
F01N 3/02 (2006.01)
F01N 3/05 (2006.01)
F01N 3/20 (2006.01)

(52) U.S. Cl.
CPC .......... F01N 3/208 (2013.01); F01N 3/0205 (2013.01); F01N 3/05 (2013.01); F01N 2270/02 (2013.01);
(Continued)

(58) Field of Classification Search
CPC .......... F01N 3/208; F01N 3/0205; F01N 3/05; F01N 3/103; F01N 3/2033; F01N 3/2066;
(Continued)

(56) References Cited
U.S. PATENT DOCUMENTS 8,122,710 B2  2/2012  Schmale et al.
8,156,733 B2  4/2012  Sisken et al.
(Continued)

OTHER PUBLICATIONS

International Search Report and Written Opinion issued for PCT/US2017/067081, dated Mar. 8, 2020, 16 pages.

Primary Examiner — Audrey B. Walter
Assistant Examiner — Dapinder Singh
(74) Attorney, Agent, or Firm — Foley & Lardner LLP

(57) ABSTRACT

An aftertreatment system includes: a selective catalytic reduction (SCR) system configured to decompose constituents of exhaust gas; an exhaust conduit configured to deliver the exhaust gas to the SCR system; a hydrocarbon insertion assembly; a valve operably coupled to the exhaust conduit, the valve configured to be selectively opened so as to allow a first gas to enter the exhaust conduit and mix with the exhaust gas; and a controller configured to: determine a SCR system temperature, in response to the SCR system temperature being less than a target temperature, instruct the hydrocarbon insertion assembly to insert hydrocarbons into the exhaust gas, and in response to the SCR system temperature being greater than the target temperature, instruct (Continued)

the valve to open so as to allow the first gas to enter the exhaust conduit, a first gas temperature of the first gas being lower than the SCR system temperature.

15 Claims, 7 Drawing Sheets

(52) U.S. Cl.
CPC ...... *F01N 2560/06* (2013.01); *F01N 2610/03* (2013.01); *F01N 2900/1602* (2013.01)

(58) Field of Classification Search
CPC ............. F01N 2270/02; F01N 2560/06; F01N 2610/02; F01N 2610/03; F01N 2900/1602; F01N 9/00; F01N 2410/00; B01D 53/9495; B01D 53/9477; B01D 53/9409; B01D 2251/2067; B01D 2251/208; B01D 2255/20738; B01D 2255/20761; B01D 2255/50; B01D 2258/12; Y02T 10/12; Y02T 10/40
See application file for complete search history.

(56) References Cited

U.S. PATENT DOCUMENTS

| 8,473,177 | B2 | 6/2013 | Madurai Kumar et al. |
| 2006/0260299 | A1 | 11/2006 | Wang et al. |
| 2010/0229539 | A1 | 9/2010 | Timmons et al. |
| 2012/0167554 | A1 | 7/2012 | Zhang et al. |
| 2013/0298528 | A1 | 11/2013 | Ramamurthy |
| 2013/0306171 | A1* | 11/2013 | Nagaoka ................ F01N 3/0814 137/551 |
| 2013/0312407 | A1* | 11/2013 | Surnilla ............... F02D 41/0002 60/605.1 |
| 2014/0311127 | A1 | 10/2014 | Lindblom et al. |
| 2014/0341781 | A1* | 11/2014 | Nagaoka ............. F02D 41/3094 422/111 |
| 2015/0240729 | A1* | 8/2015 | Shimizu .................. F02D 41/30 60/285 |
| 2016/0001227 | A1* | 1/2016 | Raux .................. B01D 53/9431 423/212 |
| 2016/0376965 | A1 | 12/2016 | Mittal et al. |

* cited by examiner

DEDICATED THERMAL MANAGEMENT FOR AN SCR SYSTEM

CROSS-REFERENCE TO RELATED APPLICATIONS

The present application is a National Phase Application of PCT/US2017/067081, filed Dec. 18, 2017, the contents of which are hereby incorporated by reference in their entirety.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems comprise any of several different components to reduce the levels of harmful exhaust emissions present in exhaust gas. For example, certain exhaust gas aftertreatment systems for diesel-powered IC engines comprise a selective catalytic reduction (SCR) system, including a catalyst formulated to convert NOx (NO and $NO_2$ in some fraction) into harmless nitrogen gas ($N_2$) and water vapor ($H_2O$) in the presence of ammonia ($NH_3$). Generally in such aftertreatment systems, an exhaust reductant (e.g., a diesel exhaust fluid such as urea) is injected into the SCR system to provide a source of ammonia and mixed with the exhaust gas to partially reduce the NOx gases. The reduction byproducts of the exhaust gas are then fluidly communicated to the catalyst included in the SCR system to decompose substantially all of the NOx gases into relatively harmless byproducts that are expelled out of the aftertreatment system.

A catalytic conversion efficiency of the SCR system is often dependent on a SCR system temperature, which corresponds to a temperature of the catalyst included in the SCR system. Too low an SCR system temperature may reduce a catalytic conversion efficiency of the SCR system. This may cause reduction in the amount of NOx removed from the exhaust gas by the SCR system, and a significant amount of unreacted ammonia remaining in the exhaust gas after passing through the SCR system (ammonia slip), which may necessitate positioning of an ammonia oxidation catalyst (AMOx) downstream of the SCR system to remove the ammonia from the exhaust gas. This increases manufacturing, operation and maintenance costs. Too high a SCR system temperature may cause thermal degradation or ageing of the catalyst of the SCR system, therefore reducing the life of the SCR system and also increasing maintenance costs.

SUMMARY

Embodiments described herein relate generally to systems and methods for controlling a temperature of a SCR system, and in particular to an aftertreatment system including components configured to control a temperature of an SCR system included therein. The aftertreatment system is configured to insert hydrocarbons into an exhaust gas flowing through the aftertreatment system to increase the SCR temperature, and flowing a cooler first gas into the exhaust gas to lower the SCR temperature of the SCR system.

In a first set of embodiments, an aftertreatment system for use with an engine producing an exhaust gas includes: a selective catalytic reduction system configured to decompose constituents of the exhaust gas; an exhaust conduit positioned upstream of the selective catalytic reduction system and configured to deliver the exhaust gas to the selective catalytic reduction system; a hydrocarbon insertion assembly configured to selectively insert hydrocarbons into the exhaust gas; valve operably coupled to the exhaust conduit, the valve configured to be selectively opened so as to allow a first gas to enter the exhaust conduit and mix with the exhaust gas in the exhaust gas conduit; and a controller operably coupled to the hydrocarbon insertion assembly and the valve, the controller configured to: determine a selective catalytic reduction system temperature of the selective catalytic reduction system, in response to the selective catalytic reduction system temperature being less than a target temperature, instruct the hydrocarbon insertion assembly to insert hydrocarbons into the exhaust gas, and in response to the selective catalytic reduction system temperature being greater than the target temperature, instruct the valve to open so as to allow the first gas to enter the exhaust conduit, a first gas temperature of the first gas being lower than the selective catalytic reduction system temperature.

In another set of embodiments, a method of maintaining a temperature of a selective catalytic reduction system receiving an exhaust gas includes: determining a selective catalytic reduction system temperature of the selective catalytic reduction system; in response to the selective catalytic reduction system temperature being less than the target temperature, inserting hydrocarbons into the exhaust gas; and in response to the selective catalytic reduction system temperature being greater than the target temperature, inserting a first gas into the exhaust gas, a first gas temperature of the first gas being lower than the selective catalytic reduction system temperature.

In yet another set of embodiments, a non-transient computer readable medium is provided for controlling an aftertreatment system that includes a selective catalytic reduction system configured to decompose constituents of an exhaust gas produced by an engine, an exhaust conduit positioned upstream of the selective catalytic reduction system and configured to deliver the exhaust gas to the selective catalytic reduction system, a hydrocarbon insertion assembly configured to selectively insert hydrocarbons into the exhaust gas, and a valve operably coupled to the exhaust conduit, the valve configured to be selectively opened so as to allow a first gas to enter the exhaust conduit and mix with the exhaust gas in the exhaust gas conduit. The non-transient computer readable medium is programmed with instructions that, when executed by a processor: determine a selective catalytic reduction system temperature of the selective catalytic reduction system; in response to the selective catalytic reduction system temperature being less than a target temperature, instruct the hydrocarbon insertion assembly to insert hydrocarbons into the exhaust gas; and in response to the selective catalytic reduction system temperature being greater than the target temperature, instruct the valve to open so as to allow the first gas to enter the exhaust conduit, a first gas temperature of the first gas being lower than the selective catalytic reduction system temperature.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
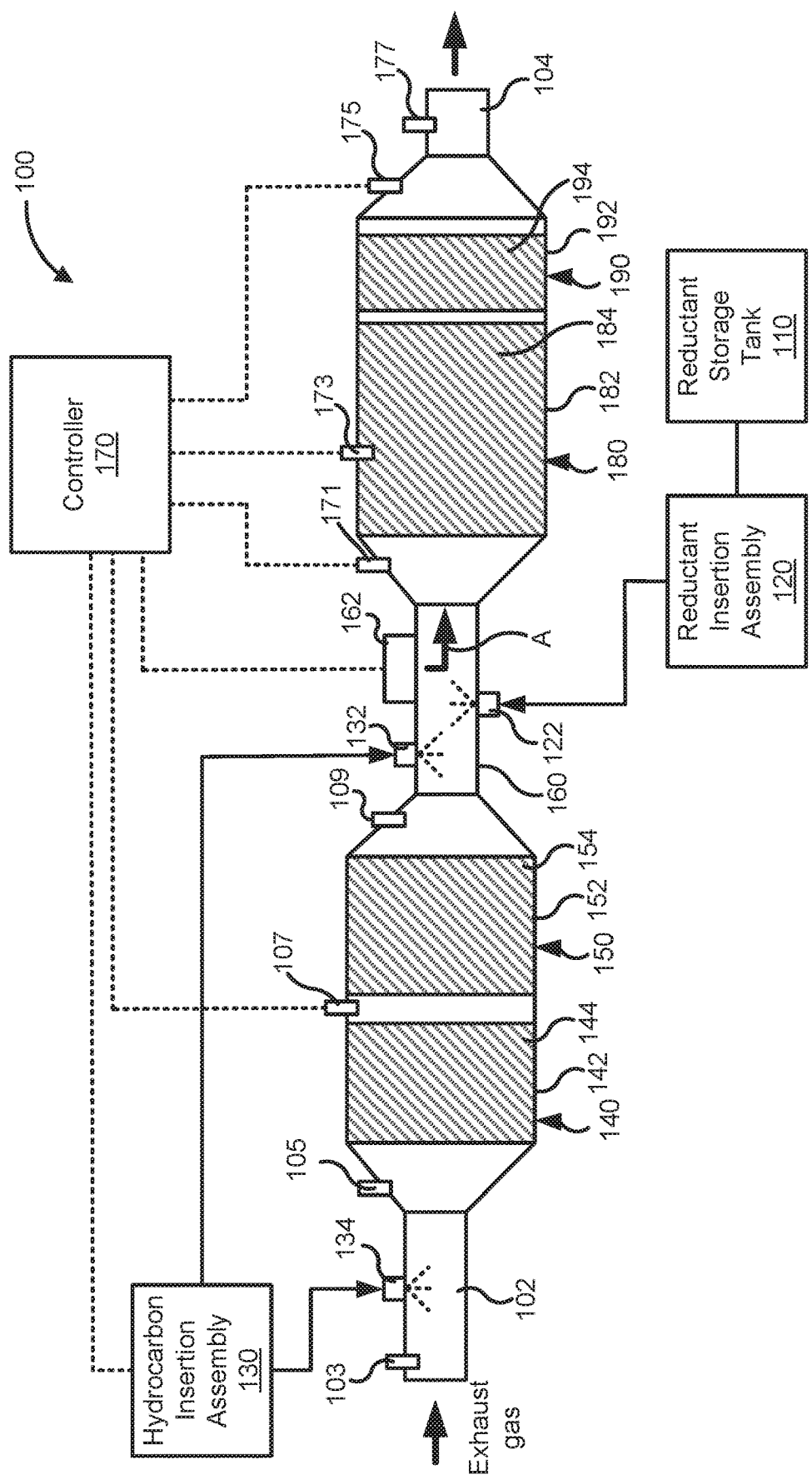
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for controlling a temperature of a SCR system, and in particular to an aftertreatment system including components configured to control a temperature of an SCR system included therein. The aftertreatment system is configured to insert hydrocarbons into an exhaust gas flowing through the aftertreatment system to increase the SCR temperature, and flowing a cooler first gas into the exhaust gas to lower the SCR temperature of the SCR system.

A catalytic conversion efficiency of the SCR system is often dependent on a SCR system temperature, which corresponds to a temperature of the catalyst included in the SCR system. Too low an SCR system temperature may reduce a catalytic conversion efficiency of the SCR system. This may cause reduction in the amount of NOx removed from the exhaust gas by the SCR system, and a significant amount of unreacted ammonia remaining in the exhaust gas after passing through the SCR system (ammonia slip), which may necessitate positioning of an ammonia oxidation catalyst (AMOx) downstream of the SCR system to remove the ammonia from the exhaust gas. This increases manufacturing, operation and maintenance costs. Too high a SCR system temperature may cause thermal degradation or ageing of the catalyst of the SCR system, therefore reducing the life of the SCR system and also increasing maintenance costs.

Figure 2:
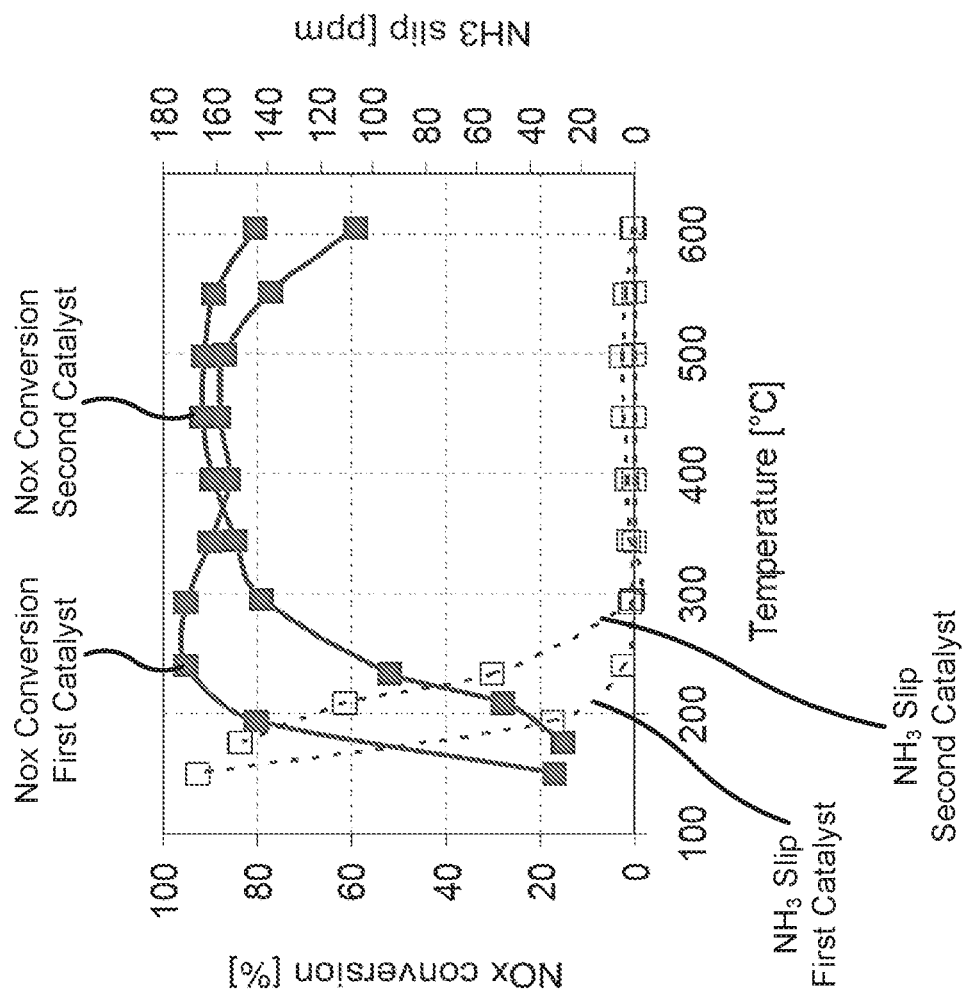
FIG. 2 shows catalytic conversion efficiency curves of a first catalyst and second catalyst at various temperatures, and the corresponding ammonia slip downstream of the first catalyst and the second catalyst.

For example, FIG. 2 shows catalytic conversion efficiency curves of a first catalyst and second catalyst at various temperatures, and the corresponding ammonia slip of the first catalyst and the second catalyst. The first catalyst may comprise a copper-zeolite catalyst, and the second catalyst may comprise an iron-zeolite catalyst. As observed in FIG. 2, below 200 degrees Celsius, the catalytic conversion efficiency (specifically, the NOx conversion efficiency) is less than 80%, which may be below requirements of emission standards set by regulatory agencies, as well as cause significant ammonia slip. The first catalyst demonstrates optimal catalytic conversion efficiency between 250 degrees Celsius and 450 degrees Celsius with negligible ammonia slip. Similarly, the second catalyst demonstrates optimal catalytic conversion efficiency between 350 degrees Celsius and 500 degrees Celsius.

Above 500 degrees Celsius, the catalytic conversion efficiency of each of the first catalyst and the second catalyst again starts decreasing, for example because of degradation of the first catalyst and the second catalyst. To counter the negative impact of thermal degradation, or otherwise ageing, conventional SCR systems often include catalysts that are oversized than what is needed so as to meet performance parameters. Therefore, to maintain optimal catalytic conversion efficiency and reduce ammonia slip, it is desirable to operate each of the first catalyst and the second catalyst, or otherwise any other catalyst of an SCR system at a target temperature, for example a temperature range (e.g., between 250 degrees Celsius and 450 degrees Celsius), an absolute temperature (e.g., 300 degrees Celsius, 350 degrees Celsius, 400 degrees Celsius, any other value or range therebetween), or within an arrow bound an absolute target temperature (e.g., within ±5%, 10%, 15% or 20% of the absolute target temperature).

Various embodiments of the systems and methods described herein for thermal management of a SCR system provide benefits including, for example: (1) proactively maintain temperature of the SCR system within a target temperature; (2) allowing operation of the SCR system at optimal catalytic conversion; (3) reducing ammonia slip to negligible levels such that an AMOx may no longer be needed in the aftertreatment system; (4) allowing reduction in size of the SCR system by eliminating the need to oversize the catalyst to account for thermal ageing; and (5) extending life of the SCR system and reducing maintenance cost.

FIG. 1 is a schematic illustration of an aftertreatment system 100, according to an embodiment. The aftertreatment system 100 is configured to receive an exhaust gas (e.g., a diesel exhaust gas) from an engine (e.g., a diesel engine, a gasoline engine, a natural gas engine, a dual fuel engine, etc.) and reduce constituents of the exhaust gas such as, for example, NOx gases, CO, hydrocarbons, etc. The aftertreatment system 100 comprises a reductant storage tank 110, a reductant insertion assembly 120, a hydrocarbon insertion assembly 130, an SCR system 180, an exhaust conduit 160, a valve 162, and a controller 170.

The aftertreatment system 100 comprises an inlet conduit 102 configured to receive an exhaust gas from the engine. An inlet NOx sensor 103 may be positioned in the inlet conduit 102 and configured to determine an amount of NOx include in the exhaust gas entering the aftertreatment system 100. In some embodiment, the inlet NOx sensor 103 may comprise a physical NOx sensor. In other embodiments, the inlet NOx sensor 103 may comprise a virtual NOx sensor. For example, the controller 170 may be configured to determine an inlet NOx amount in the exhaust gas from various parameters of the engine (e.g., engine speed, torque, operating at stoichiometric condition, lean conditions, etc.).

In particular embodiments, a first oxidation catalyst 140 may be positioned downstream of the inlet conduit 102 and fluidly coupled thereto, so as to receive the exhaust gas therefrom. The first oxidation catalyst 140 may include a first oxidation catalyst housing 142 within which a first oxidation catalyst element 144 is positioned. The first oxidation catalyst element 144 may be configured to decompose unburnt hydrocarbons and/or carbon monoxide included in the exhaust gas. In particular embodiments, the first oxidation catalyst 140 comprise a diesel oxidation catalyst. A first oxidation catalyst temperature sensor 105 may be positioned upstream of the first oxidation catalyst 140 and configured to determine a temperature of the exhaust gas entering the first oxidation catalyst 140.

In some embodiments, a filter 150 is positioned downstream of the first oxidation catalyst 140. The filter 150 may comprise a housing 152 within which a filter element 154 is positioned. The filter element 154 may be configured to filter particulate matter such as soot, carbon, dust, debris, etc. included in the exhaust gas. A filter inlet temperature sensor 107 may be positioned upstream of the filter 150 and configured to determine a temperature of exhaust gas entering the filter 150. A filter outlet temperature sensor 109 may also be positioned downstream of the filter 150 and configured to determine a temperature of the exhaust gas leaving the filter 150. Any of the exhaust gas temperature determined by the filter inlet temperature sensor 107, the filter outlet temperature sensor 109, and/or an average thereof (e.g., a weighted average) may be indicative of a filter temperature of the filter 150. For example, the filter inlet temperature sensor 107 may generate a temperature signal indicative of the filter temperature.

An exhaust conduit 160 is positioned upstream of the SCR system 180 (e.g., downstream of the filter 150) and fluidly coupled thereto so as to deliver the exhaust gas thereto. In particular embodiments, a mixer (not shown) may be positioned in the exhaust conduit 160, and configured to enhance mixing of the reductant with the exhaust gas. The mixer may include any suitable features including but not limited to baffles, plates, vanes, swirl generating features, any other suitable feature or a combination thereof. In various embodiments, a NOx sensor, an oxygen sensor, a temperature sensor, a pressure sensor, or any other sensor may also be positioned in the exhaust conduit 160 so as to determine one or more operational parameters of the exhaust gas flowing through the exhaust conduit 160.

A valve 162 is operably coupled to the exhaust conduit 160. The valve 162 is configured to be selectively opened to allow a first gas (e.g., air or a portion of the exhaust gas from downstream of the SCR system 180) to enter the exhaust conduit 160 and mix with the exhaust gas. The first gas has a first gas temperature lower than the SCR system temperature, and may also be lower than the exhaust gas temperature. In some embodiments, a valve position of the valve 162 may be controllable so as to allow control of a flow rate of the first gas flowing into the exhaust conduit 160. In other embodiments, the valve 162 may simply be an open and close valve so that the flow rate of the exhaust gas when the valve 162 is open is substantially the same for each open cycle.

Flowing the first gas into the exhaust gas cools the exhaust gas. The cooler exhaust gas flowing into the SCR system 180 cools the SCR system 180, for example to lower the SCR system temperature to a target temperature (e.g., in the range of 250-450 degrees Celsius). The valve 162 may include, for example a check valve, a spring loaded valve, a one-way valve, a butterfly valve, a diaphragm valve, any other suitable valve or a combination thereof.

In particular embodiments, the aftertreatment system 100 may also comprise a heat exchanger (e.g., the heat exchanger 264 or 364). The heat exchanger may include, for example, a radiator, an air cooler, a tube heat exchanger, a parallel plate heat exchanger or any other suitable heat exchanger. The heat exchanger may be configured to cool the first gas. For example, the first gas (e.g., air and/or a portion of the exhaust gas) may flow through the heat exchanger, which cools the first gas as it flows into the exhaust conduit 160.

In some embodiments, the exhaust conduit 160 may comprise a single exhaust gas flow path, and the valve 162 may be positioned on a sidewall of the exhaust conduit 160. The exhaust valve 162 may be selectively opened to allow the first gas, for example atmospheric air from the environment or from an air tank, to flow into the exhaust conduit 160.

Figure 3:
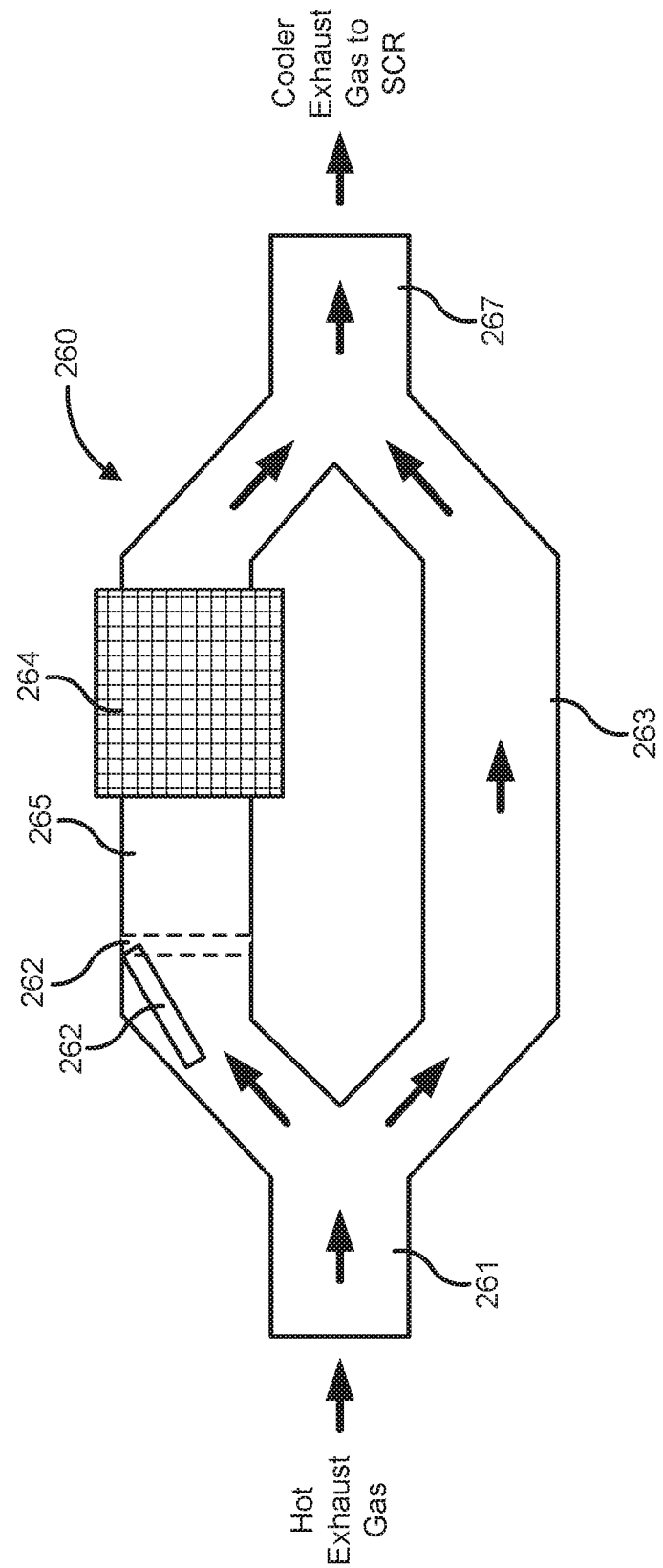
FIG. 3 is a schematic illustration of an exhaust conduit which may be included in the aftertreatment system of FIG. 1, according to an embodiment.

In other embodiments, the exhaust conduit 160 may include a first leg and a second leg. For example, FIG. 3 is a schematic illustration of an exhaust conduit 260 according to another embodiment. The exhaust conduit 260 may be used in the aftertreatment system 100 or any other aftertreatment system described herein. The exhaust conduit 260 comprises an exhaust conduit inlet 261 configured to receive the exhaust gas. The exhaust conduit 260 comprises a first leg 263 and a second leg 265. Each of the first leg 263 and the second leg 265 are fluidly coupled to the exhaust conduit inlet 261. The first leg 263 is configured to receive an exhaust gas first portion of the exhaust gas, and the second leg 265 is configured to receive an exhaust gas second portion of the exhaust gas.

Each of the first leg 263 and the second leg 265 are also fluidly coupled to a plenum 267 positioned downstream thereof. The plenum 267 is configured to receive and combine the exhaust gas first portion and the exhaust gas second portion, and deliver to an SCR system positioned downstream thereof (e.g., the SCR system 180).

A valve 262 is positioned near an inlet of the second leg 265. The valve 262 may be substantially similar to the valve 162 and, therefore not described in further detail herein. A heat exchanger 264 is positioned downstream of the valve 262, and operably coupled to the second leg 265. Closing the valve 262 prevents the exhaust gas second portion from entering the second leg 265, such that all the exhaust gas flows through the first leg 263 towards the SCR system.

The valve 262 may be selectively opened to allow the exhaust gas second portion to flow through the second leg 265. For example, if it is determined that an SCR system temperature is greater than a target temperature (e.g., in the range of 250-450 degrees Celsius), the valve 262 may be opened to allow the exhaust gas second portion to flow through the second leg 265. The exhaust gas second portion flows through the heat exchanger 264 which cools the exhaust gas second portion to a temperature significantly below a temperature of the exhaust gas first portion. The cooler exhaust gas second portion combines with the exhaust gas first portion in the plenum 267 so as to cool the exhaust gas first portion therein. In this manner, the exhaust gas temperature may be cooled to a temperature below the SCR system temperature such that the exhaust gas cools the SCR system 180 towards the target temperature as it flows therethrough.

Figure 4:
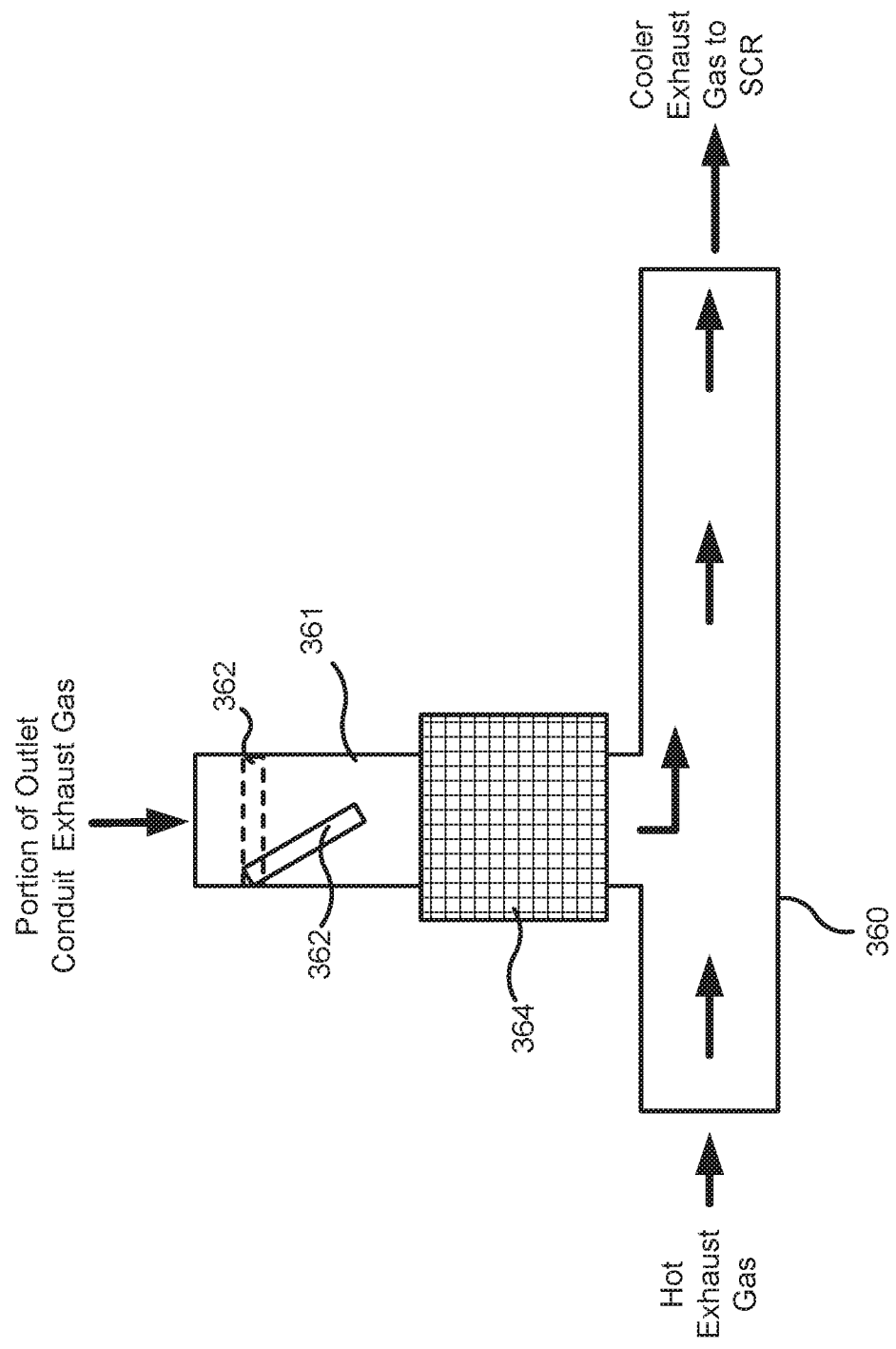
FIG. 4 is a schematic illustration of an exhaust conduit which may be included in the aftertreatment system of FIG. 1 according to another embodiment.

In yet another embodiment, the exhaust conduit 160 may be configured to receive a first gas that comprises a portion of an outlet conduit exhaust gas recirculated from downstream of the SCR system 180 (e.g., from an outlet conduit 104 of the aftertreatment system 100). For example, FIG. 4 is a schematic illustration of an exhaust conduit 360, according to particular embodiment which may be used in the aftertreatment system 100.

A recirculation tube 361 is fluidly coupled to the exhaust conduit 360. The recirculation tube 361 may also be fluidly coupled to an outlet conduit positioned downstream of the SCR system (e.g., the outlet conduit 104 positioned downstream of the SCR system 180), such that the recirculation tube 361 fluidly couples the outlet conduit to the exhaust conduit 360. The recirculation tube 361 is configured to recirculate a portion of the outlet conduit exhaust gas from downstream of the SCR system back to the exhaust conduit 360.

A valve 362 is positioned within the recirculation tube 361. The valve 362 may be substantially similar to the valve 162 or 262 and therefore not described in further detail herein. The valve 362 is configured to selectively open (e.g., when the SCR system temperature is greater than a target temperature) to deliver the portion of the outlet conduit exhaust gas back (i.e., the first gas) to the exhaust conduit 360. A heat exchanger 364 is operably coupled to the recirculation tube 361 (e.g., upstream or downstream of the valve 362). The heat exchanger 364 is configured to cool the portion outlet conduit exhaust gas before the portion of the outlet conduit exhaust gas flows into the exhaust conduit 360. The cooled outlet conduit exhaust gas portion then mixes with and cools the exhaust gas flowing through the exhaust conduit 360 towards the SCR system (e.g., the SCR system 180), thereby cooling the SCR system.

Referring to FIGS. 1-4, The SCR system 180 is positioned downstream of the exhaust conduit 160 and fluidly coupled thereto, so as to receive the exhaust gas therefrom. The SCR system 180 comprises a housing 182 defining an internal volume within which a catalyst 184, configured to decompose NOx gases in the presence of a reductant, is positioned. The housing 182 may be formed from a rigid, heat-resistant and corrosion-resistant material, for example stainless steel, iron, aluminum, metals, ceramics, or any other suitable material. The housing 182 may have any suitable cross-section, for example circular, square, rectangular, oval, elliptical, polygonal, or any other suitable shape.

In some embodiments, a SCR temperature sensor 173 may be positioned in the SCR system 180 and configured to determine the SCR system temperature. For example, the SCR temperature sensor 173 may be positioned within the catalyst 184 of the SCR system 180. The SCR temperature sensor 173 may generate a temperature signal indicative of the SCR system temperature.

In other embodiments, a first temperature sensor 171 may be positioned at an inlet of the SCR system 180 and configured to determine a SCR system inlet temperature of the exhaust gas entering the SCR system 180. Moreover, a second temperature sensor 175 may be positioned at an outlet of the SCR system 180 and configured to determine a SCR system outlet temperature of the exhaust gas exiting the SCR system 180. The first temperature sensor 171 may generate a SCR system inlet temperature signal indicative of the SCR system inlet temperature, and the second temperature sensor 175 may generate a SCR system outlet temperature signal indicative of the SCR system outlet temperature. In particular embodiments, a weighted average of the SCR system inlet temperature and the SCR system outlet temperature is indicative of the SCR system temperature.

The catalyst 184 of the SCR system 180 is formulated to decompose constituents of an exhaust gas, for example NOx gases, included in the exhaust gas flowing through the aftertreatment system 100. A reductant insertion port 122 may be provided in the exhaust conduit 160 and configured to allow insertion of a reductant (e.g., urea) therethrough into the exhaust conduit 160, for mixing with the exhaust gas flowing into the SCR system 180.

In other embodiments, the reductant insertion portion 122 may be provided on a sidewall of housing 182 and configured to allow insertion of a reductant (e.g., urea) therethrough into the internal volume defined by the housing 182. The reductant insertion port 122 may be positioned upstream of the catalyst 184 (e.g., to allow reductant to be inserted into the exhaust gas upstream of the catalyst 184) or over the catalyst 184 (e.g., to allow reductant to be inserted directly on the catalyst 184).

The catalyst 184 is formulated to selectively decompose constituents of the exhaust gas. Any suitable catalyst can be used such as, for example, platinum, palladium, rhodium, cerium, iron, manganese, copper, vanadium based catalyst, any other suitable catalyst, or a combination thereof. The catalyst 184 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 184. Such washcoat materials may comprise, for example, aluminum oxide, titanium dioxide, silicon dioxide, any other suitable washcoat material, or a combination thereof. The exhaust gas (e.g., diesel exhaust gas) can flow over and/or about the catalyst 184 such that any NOx gases included in the exhaust gas are further reduced to yield an exhaust gas which is substantially free of NOx gases.

In some embodiments, a second oxidation catalyst 190 may be positioned downstream of the SCR system 180. The second oxidation catalyst 190 may comprise a housing 192 defining an internal volume within which a catalyst 194 is positioned. In particular embodiments, the second oxidation catalyst 190 may comprise an AMOx catalyst formulated to decompose any ammonia ($NH_3$) gas generated by the reductant which remains unreacted in the SCR system 180, and flows downstream thereof.

The reductant storage tank 110 is configured to store the reductant. The reductant is formulated to facilitate decomposition of the constituents of the exhaust gas (e.g., NOx gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by volume of urea and 67.5% by volume of deionized water.

A reductant insertion assembly 120 is fluidly coupled to the reductant storage tank 110. In some embodiments, the reductant insertion assembly 120 may be configured to selectively insert the reductant into the exhaust conduit 160 via the reductant insertion port 122. In other embodiments, the reductant insertion assembly 120 may be configured to insert the reductant directly into the SCR system 180 (e.g., over the catalyst 184 of the SCR system 180). The reductant insertion assembly 120 may comprise various structures to facilitate receiving the reductant from the reductant storage tank 110, and delivery to the SCR system 180.

For example, the reductant insertion assembly 120 may comprise one or more pumps having filter screens (e.g., to prevent solid particles of the reductant or contaminants from flowing into the pump) and/or valves (e.g., check valves) positioned upstream thereof to receive reductant from the reductant storage tank 110. In some embodiments, the pump may comprise a diaphragm pump but any other suitable pump may be used such as, for example, a centrifugal pump, a suction pump, etc.

The pump may be configured to pressurize the reductant so as to provide the reductant to the SCR system 180 at a predetermined pressure. Screens, check valves, pulsation dampers, or other structures may also be positioned downstream of the pump to provide the reductant to the SCR system 180. In various embodiments, the reductant insertion assembly 120 may also comprise a bypass line configured to provide a return path of the reductant from the pump to the reductant storage tank 110.

A valve (e.g., an orifice valve) may be provided in the bypass line. The valve may be configured to allow the reductant to pass therethrough to the reductant storage tank 110 if an operating pressure of the reductant generated by the pump exceeds a predetermined pressure so as to prevent over pressurizing of the pump, the reductant delivery lines, or other components of the reductant insertion assembly 120. In some embodiments, the bypass line may be configured to allow the return of the reductant to the reductant storage tank 110 during purging of the reductant insertion assembly 120 (e.g., after the aftertreatment system 100 is shut off).

In various embodiments, the reductant insertion assembly 120 may also comprise a blending chamber configured to receive pressurized reductant from a metering valve at a controllable rate. The blending chamber may also be configured to receive air, or any other inert gas (e.g., nitrogen), for example from an air supply unit so as to deliver a combined flow of the air and the reductant to the SCR system 180 through the reductant insertion port 122. In various embodiments, a nozzle may be positioned in the reductant insertion port 122 and configured to deliver a stream or a jet of the reductant into the exhaust conduit 160.

In various embodiments, the reductant insertion assembly 120 may also comprise a dosing valve, for example positioned within a reductant delivery line for delivering the reductant from the reductant insertion assembly 120 to the SCR system 180. The dosing valve may comprise any suitable valve, for example a butterfly valve, a gate valve, a check valve (e.g., a tilting disc check valve, a swing check valve, an axial check valve, etc.), a ball valve, a spring loaded valve, an air assisted injector, a solenoid valve, or any other suitable valve. The dosing valve may be selectively opened to insert a predetermined quantity of the reductant for a predetermined time into the SCR system 180 or upstream therefrom. Opening and/or closing of the dosing valve may produce an audible sound (e.g., a clicking sound).

The hydrocarbon insertion assembly 130 is configured to selectively insert hydrocarbons into the exhaust gas flowing through the aftertreatment system 100. The hydrocarbons may include a fuel (e.g., gasoline, diesel, natural gas, etc.) used by the engine producing the exhaust gas. The hydrocarbon insertion assembly 130 may include pumps, valves, nozzles, and/or any other suitable components or features for inserting the hydrocarbons into the exhaust gas flowing through the aftertreatment system 100.

In some embodiments, the hydrocarbon insertion assembly 130 may be fluidly coupled to the exhaust conduit 160 and configured to insert the hydrocarbons into the exhaust conduit 160 upstream of the SCR system 180. For example, a first hydrocarbon insertion port 132 may be positioned on the exhaust conduit 160, and configured to allow insertion of the hydrocarbons into the exhaust conduit 160. In other embodiments, the hydrocarbon insertion assembly 130 may be configured to insert the hydrocarbons upstream of the first oxidation catalyst 140. For example, a second hydrocarbon insertion port 134 may be positioned on the inlet conduit 102 or on the first oxidation catalyst housing 142, so as to allow insertion of the hydrocarbons into the first oxidation catalyst 140. In still other embodiments, the hydrocarbon insertion assembly 130 may be configured to insert the hydrocarbons upstream of the first oxidation catalyst 140 as well as into the exhaust conduit 160.

Insertion of the hydrocarbons into the exhaust gas raises the temperature of the exhaust gas (e.g., due to oxidation of the hydrocarbons in the first oxidation catalyst 140, and/or combustion of the hydrocarbons in the exhaust gas). For example, the SCR temperature may be below the target temperature (e.g., on engine startup). Insertion of the hydrocarbons into the exhaust gas heats the exhaust gas, which in turn heats the SCR system 180, thereby increasing the SCR system temperature towards the target temperature. In this manner, a combination of selectively inserting the hydrocarbons into the exhaust gas via the hydrocarbon insertion assembly 130 when the SCR temperature is below the target temperature, and selectively opening the valve 162 to flow the cooler first gas into the exhaust gas when the SCR temperature is above the target temperature allows maintaining of the SCR temperature at the target temperature (e.g., in the range of 250 degrees Celsius to 450 degrees Celsius).

As described with respect to FIG. 2, operating the SCR system 180 at the target temperature allows the SCR system 180 to operate at an optimal catalytic conversion efficiency. Furthermore, ammonia slip downstream of the SCR system 180 may be negligible, such that the second oxidation catalyst 190 (e.g., an AMOx catalyst) may not be needed downstream of the SCR system 180, therefore lowering manufacturing as well as maintenance costs.

As described before, the outlet conduit 104 is positioned downstream of the SCR system 180 (e.g., downstream of the second oxidation catalyst 190). The outlet conduit 104 may be configured to expel the treated exhaust gas into the environment. An outlet NOx sensor 177 may be positioned in the outlet conduit 104 and configured to determine an outlet NOx amount in the exhaust gas exiting the SCR system 180. Other sensors, for example oxygen sensors, particulate matter sensors, and/or temperature sensors may also be positioned in the outlet conduit 104.

In some embodiments, a controller 170 may be operatively coupled to the hydrocarbon insertion assembly 130 and the valve 162. The controller 170 may comprise any suitable controller, for example the computing device 570. The controller 170 is configured to maintain the SCR system temperature within the target temperature (e.g., in the range of 250 degrees Celsius and 450 degrees Celsius). In some embodiments, the target temperature may be an absolute temperature (e.g., 300 degrees Celsius, 350 degrees Celsius, 400 degrees Celsius, or any other value or range therebetween), and the controller 170 may be configured to maintain the SCR system temperature at the target temperature or within an error bound (e.g., ±5%, 10%, 15% or 20%) of the target temperature.

Expanding further, the controller 170 may determine an SCR system temperature of the SCR system 180. In some embodiments, the controller 170 may be operably coupled to the SCR temperature sensor 173. The controller 170 may receive a SCR temperature signal from the SCR temperature sensor 173 which is indicative of the SCR system temperature, and determine the SCR system temperature therefrom.

In other embodiments, the controller 170 may be operable coupled to the filter inlet temperature sensor 107. The controller 170 may receive a filter inlet temperature sensor signal from the filter inlet temperature sensor 107, indicative of the exhaust gas temperature at the inlet of the filter 150. The exhaust gas temperature upstream of the filter 150 (e.g., at the inlet of the filter 150) may correspond to the SCR system temperature and, therefore the controller 170 may use the filter inlet temperature sensor signal to determine the SCR system temperature.

In still other embodiments, the controller 170 may be operably coupled to the first temperature sensor 171 and the second temperature sensor 175, and configured to receive the SCR system inlet temperature signal and the SCR system outlet temperature signal therefrom, respectively. A described before, the SCR system inlet temperature signal and the SCR system outlet temperature signal are indicative of the SCR system inlet temperature and the SCR system outlet temperature, and the controller 170 may use these temperatures to determine the SCR system temperature. For example, the controller 170 may calculate a weighted average of the SCR system inlet temperature and the SCR system outlet temperature, the weighted average corresponding to the SCR system temperature.

In response to the SCR system temperature being less than the target temperature the controller 170 instructs the hydrocarbon insertion assembly 130 to insert hydrocarbons into the aftertreatment system 100. For example, the SCR system temperature may drop below a lower bound of a target temperature range (e.g., below 250 degrees Celsius), drop below an absolute target temperature (e.g., 300, 350 or 400 degrees Celsius) or below an error bound of an absolute target temperature (e.g., below ($T_{tar}-xT_{tar}$), where $T_{tar}$=target temperature and x is 5%, 10%, 15%, 20% or any other range or value). The hydrocarbon insertion assembly 130 may insert the hydrocarbons upstream or over the first oxidation catalyst 140 (e.g., a diesel oxidation catalyst) and/or in the exhaust conduit 160, as previously described herein. Insertion of the hydrocarbons increases the temperature of the exhaust gas flowing into the SCR system 180, thereby increasing the SCR system temperature towards the target temperature.

In response to SCR system temperature being greater than the target temperature, the controller 170 instructs the valve 162 to open so as to allow the first gas (e.g., air or a recirculated portion of the outlet conduit exhaust gas) to enter the exhaust conduit 160. For example, the SCR system temperature may increase above an upper bound of a target temperature range (e.g., above 450 degrees Celsius), increase above an absolute target temperature (e.g., 300, 350 or 400 degrees Celsius), or increase above an upper error bound of an absolute target temperature (e.g., above ($T_{tar}+xT_{tar}$), where $T_{tar}$=target temperature and x is 5%, 10%, 15%, 20% or any other range or value). As previously described herein, the first gas temperature is less than the exhaust gas temperature, for example by flowing the first gas through the heat exchanger 264, 364, such that the first gas mixes with and cools the exhaust gas flowing through the exhaust conduit 160. The cooled exhaust gas then cools the SCR system 180 as it flows therethrough, thereby reducing the SCR system temperature towards the target temperature.

If the SCR system temperature is at the target temperature (e.g., within 250-450 degrees Celsius, at the absolute target temperature, or within a lower and upper bound of an absolute target temperature), the controller 170 may not take any action and may continue to monitor the SCR system temperature.

Figure 5:
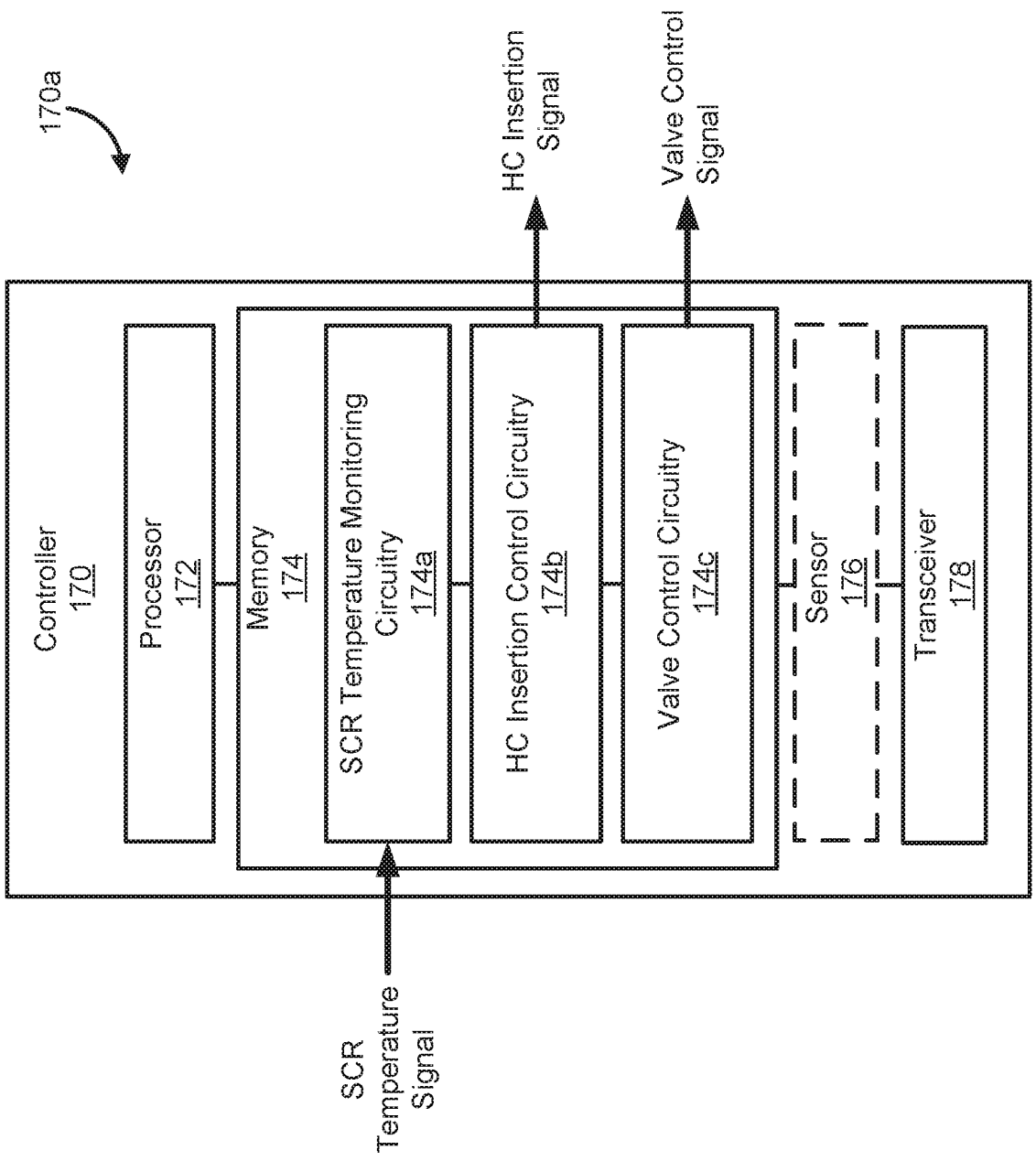
FIG. 5 is schematic block diagram of a controller, according to a particular embodiment.
Figure 6:
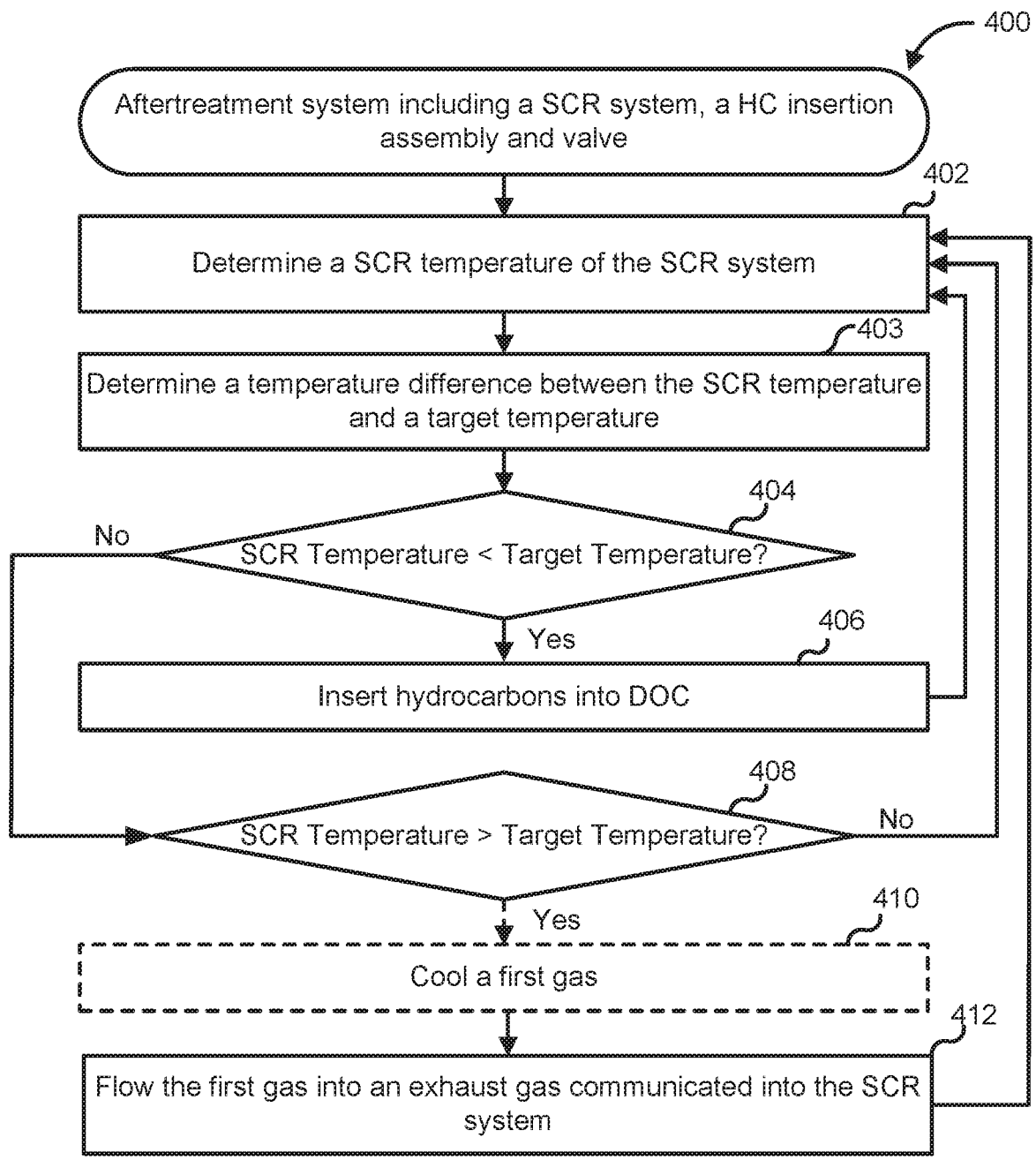
FIG. 6 is a schematic flow diagram of a method for controlling a SCR temperature of an SCR system, according to an embodiment.

In particular embodiments, the controller 170 may be included in a control circuitry. For example, FIG. 5 is a schematic block diagram of a control circuitry 170a that comprises the controller 170, according to an embodiment. The controller 170 comprises a processor 172, a memory 174, or any other computer readable medium, a transceiver 178, and a sensor 176. It should be understood that the controller 170 shows only one embodiment of the controller 170 and any other controller capable of performing the operations described herein can be used.

The processor 172 may comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

For example, the memory 174 may comprise a SCR temperature monitoring circuitry 174a, a hydrocarbon (HC) insertion control circuitry 174b, and a valve control circuitry 174c. The SCR temperature monitoring circuitry 174a is configured to receive and interpret an SCR temperature signal, for example a current or a voltage (e.g., via the sensor 176), from the temperature sensor, for example the filter inlet temperature sensor 107, the SCR temperature sensor 173, and/or the first temperature sensor 171 and the second temperature sensor 175. The SCR temperature monitoring circuitry 174a determines the SCR temperature from the SCR temperature signal, and determines if the SCR temperature is greater than or less than target temperature.

The hydrocarbon insertion control circuitry 174b is configured to generate a hydrocarbon insertion signal, responsive to which the hydrocarbon insertion assembly 130 inserts the hydrocarbons into the exhaust gas flowing through the aftertreatment system 100. In response to the SCR system temperature being less than the target temperature, the SCR temperature monitoring circuitry 174a may command the hydrocarbon insertion control circuitry 174b to generate the hydrocarbon insertion signal. The hydrocarbon insertion signal is communicated to the hydrocarbon insertion assembly 130 (e.g., via the transceiver 178), and instructs the hydrocarbon insertion assembly 130 to insert hydrocarbons into the exhaust gas.

The valve control circuitry 174c is configured to generate a valve control signal, responsive to which the valve 162 opens to allow the first gas to flow into the exhaust conduit 160. In response to the SCR system temperature being greater than the target temperature, the SCR temperature monitoring circuitry 174a may command the valve control circuitry 174c to generate the valve control signal. The valve control signal is communicated to the valve 162 (e.g., via the transceiver 178) and instructs the valve 162 to open so as to allow the first gas to enter the exhaust conduit 160. Since the first gas temperature of the first gas is lower than the SCR system temperature, the first gas cools the SCR system 180 and reduces the SCR system temperature as it flow therethrough with the exhaust gas.

FIG. 4 is a schematic flow diagram of an example method 400 for controlling the temperature of an SCR system (e.g., the SCR system 180) included in an aftertreatment system (e.g., the aftertreatment system 100). The aftertreatment system also includes a hydrocarbon insertion assembly (e.g., the hydrocarbon insertion assembly 130), an exhaust conduit (e.g., the exhaust conduit 160, 260, 360) and a valve (e.g., the valve 162, 262, 362).

The method 400 comprises determining a temperature of the SCR system, at 402. For example, the SCR temperature monitoring circuitry 174a receives a temperature signal from the temperature sensor (e.g., the filter inlet temperature sensor 107, the SCR temperature sensor 173, and/or the first temperature sensor 171 and the second temperature sensor 175) and determines the SCR system temperature therefrom.

A temperature difference between the SCR system temperature and a target temperature is determined, at 403. For example, the SCR temperature monitoring circuitry 174a determines the difference between the SCR system temperature and the target temperature. The target temperature may comprise a temperature range (e.g., between 250-450 degrees Celsius), an absolute temperature (e.g., 300 degrees Celsius, 350 degrees Celsius, 400 degrees Celsius or any other value), or a range described by an error bound of an absolute target temperature (e.g., ±5%, 10%, 15% or 20% of an absolute target temperature e.g., 300 degrees Celsius, 350 degrees Celsius, 400 degrees Celsius or any other value).

It is determined if the SCR system temperature is less than a target temperature, at 404. In response to the temperature difference being less than the target temperature, hydrocarbons are inserted into the exhaust gas, at 406. For example, if the SCR temperature monitoring circuitry 174a determines that the SCR system temperature is less than the target temperature, the SCR temperature monitoring circuitry 174a commands the hydrocarbon insertion control circuitry 174b to generate the hydrocarbon insertion signal, instructing the hydrocarbon insertion assembly 130 to insert hydrocarbons into the exhaust gas (e.g., in the exhaust conduit 160 or over the first oxidation catalyst 140). The inserted hydrocarbons increase a temperature of the exhaust gas, as previously described herein, and subsequently increase the SCR system temperature of the SCR system 180 as it flows therethrough.

If the SCR system temperature is not less than the target temperature, it is determined if the SCR system temperature is greater than the target temperature, at 408. If the SCR system temperature is greater than the target temperature, a first gas is flown into the exhaust gas communicated into SCR system, at 412. For example, if the SCR temperature monitoring circuitry 174a determines that the SCR system temperature is greater than the target temperature, the SCR temperature monitoring circuitry 174a commands the valve control circuitry 174c to generate the valve control signal, instructing the valve 162, 262, 362 to open, thereby allowing a first gas (e.g., air or a recirculated portion of an outlet exhaust gas) to flow into the exhaust gas flowing through the exhaust conduit 160, 260, 360. Since a first gas temperature of the first gas is less than the SCR temperature, the first gas cools the SCR system 180 as it flows therethrough mixed with the exhaust gas.

In some embodiments, the method 400 also comprises cooling the exhaust gas, at 410 before flowing the first gas into the exhaust gas communicated to the SCR system. For example, the first gas may be flown through the heat exchanger 264, 364 before delivering the first gas to the exhaust conduit 160, 260, 360. This may increase a temperature difference between the first gas and the SCR system 180 so as to allow rapid cooling of the SCR system 180.

Figure 7:
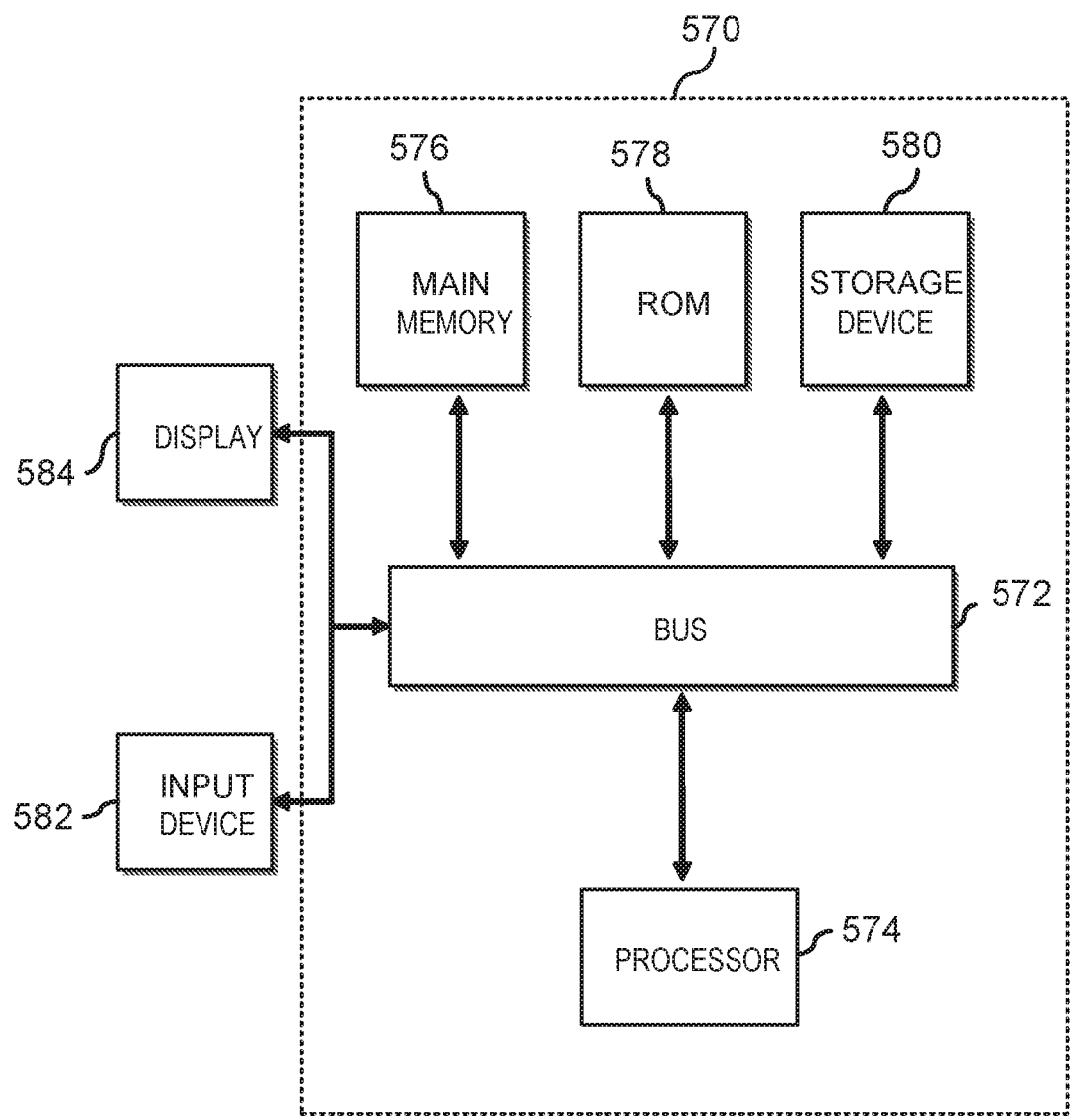
FIG. 7 is a schematic block diagram of a computing device which may be used as the controller shown in FIG. 1 and/or 5.

In some embodiments, the controller 170, the control circuitry 170a, or any of the controller or control circuitries described herein can comprise a system computer of an apparatus or system which comprises the aftertreatment system 100 (e.g., a vehicle, an engine or generator set, etc.). For example, FIG. 7 is a block diagram of a computing device 570 in accordance with an illustrative implementation. The computing device 570 can be used to perform any of the methods or the processes described herein, for example the method 400. In some embodiments, the controller 170 can comprise the computing device 570. The computing device 570 comprises a bus 572 or other communication component for communicating information. The computing device 570 can also comprise one or more processors 574 or processing circuits coupled to the bus 572 for processing information.

The computing device 570 also comprises main memory 576, such as a random access memory (RAM) or other dynamic storage device, coupled to the bus 572 for storing information and instructions to be executed by the processor 574. Main memory 576 can also be used for storing position information, temporary variables, or other intermediate information during execution of instructions by the processor 574. The computing device 570 may further comprise ROM 578 or other static storage device coupled to the bus 572 for storing static information and instructions for the processor 574. A storage device 580, such as a solid-state device, magnetic disk or optical disk, is coupled to the bus 572 for persistently storing information and instructions. For example, instructions corresponding operations of the method 400 can be stored on the storage device 580.

The computing device 570 may be coupled via the bus 572 to a display 584, such as a liquid crystal display or active matrix display, for displaying information to a user. An input device 582, such as a keyboard or alphanumeric pad, may be coupled to the bus 572 for communicating information and command selections to the processor 574. In another implementation, the input device 582 has a touch screen display 584.

According to various implementations, the processes and methods described herein can be implemented by the computing device 570 in response to the processor 574 executing an arrangement of instructions contained in main memory 576 (e.g., the operations of the method 400). Such instructions can be read into main memory 576 from another non-transitory computer-readable medium, such as the storage device 580. Execution of the arrangement of instructions contained in main memory 576 causes the computing device 570 to perform the illustrative processes described herein. One or more processors in a multi-processing arrangement may also be employed to execute the instructions contained in main memory 576. In alternative implementations, hardwired circuitry may be used in place of or in combination with software instructions to effect illustrative implementations. Thus, implementations are not limited to any specific combination of hardware and software.

Although an example computing device has been described in FIG. 7, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs (i.e., one or more circuitries of computer program instructions) encoded on one or more computer storage media for execution by, or to control the operation of, data processing apparatus. A computer storage medium comprises a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including, by way of example, a programmable processor, a computer, a system on a chip, or multiple ones, or combinations of the foregoing. The apparatus can comprise special purpose logic, e.g., an FPGA (field programmable gate array) or an ASIC (application-specific integrated circuit). In addition to hardware, the apparatus can also comprise code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer, on multiple computers that are located at one site, or distributed across multiple sites and interconnected by a communication network.

Processors suitable for the execution of a computer program comprise, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also comprise, or be operatively coupled to receive data from or transfer data to, or both, one or more mass storage devices for storing data (e.g., magnetic, magneto-optical disks, or optical disks). However, a computer need not have such devices. Devices suitable for storing computer program instructions and data comprise all forms of non-volatile memory, media and memory devices, including, by way of example, semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system for use with a diesel engine producing an exhaust gas, the aftertreatment system comprising:
    a selective catalytic reduction system configured to decompose constituents of the exhaust gas;
    an exhaust conduit positioned upstream of the selective catalytic reduction system and configured to deliver the exhaust gas to the selective catalytic reduction system;
    a hydrocarbon insertion assembly coupled to the exhaust conduit upstream of the selective catalytic reduction system and configured to selectively insert hydrocarbons into the exhaust gas;
    a valve operably coupled to the exhaust conduit, the valve configured to be selectively opened so as to allow a first gas to enter the exhaust conduit and mix with the exhaust gas in the exhaust gas conduit; and
    a controller operably coupled to the hydrocarbon insertion assembly and the valve, the controller configured to:
        determine a selective catalytic reduction system temperature of the selective catalytic reduction system,
        in response to the selective catalytic reduction system temperature being less than a target temperature, instruct the hydrocarbon insertion assembly to insert hydrocarbons into the exhaust gas, thereby increasing the selective catalytic reduction system temperature, and
        in response to the selective catalytic reduction system temperature being greater than the target temperature, instruct the valve to open so as to allow the first gas, which has a temperature lower than the selective catalytic reduction system temperature, to enter the exhaust conduit, thereby decreasing the selective catalytic reduction system temperature.

2. The aftertreatment system of claim 1, further comprising:
    a diesel oxidation catalyst positioned upstream of the selective catalytic reduction system,
    wherein the hydrocarbon insertion assembly is configured to insert the hydrocarbons into the diesel oxidation catalyst or upstream of the diesel oxidation catalyst.

3. The aftertreatment system of claim 1, wherein the first gas comprises at least one of air or a cooled portion of the exhaust gas.

4. The aftertreatment system of claim 1, further comprising a heat exchanger configured to cool the first gas to the first gas temperature.

5. The aftertreatment system of claim 4, wherein the exhaust conduit comprises:
    a first leg configured to a receive a first portion of the exhaust gas;
    a second leg configured to receive a second portion of the exhaust gas; and
    a plenum positioned downstream of the first leg and the second leg, the plenum configured to receive the first portion of the exhaust gas and the second portion of the exhaust gas,
    wherein the valve is positioned within the second leg and is configured to selectively open to allow the second portion of the exhaust gas flow through the second leg, and
    wherein the heat exchanger is operably coupled to the second leg, the heat exchanger configured to cool the second portion of the exhaust gas and to output the cooled second portion of the exhaust gas as the first gas to cool the first portion of the exhaust gas.

6. The aftertreatment system of claim 4, further comprising:
    an outlet conduit positioned downstream of the selective catalytic reduction system; and
    a recirculation tube fluidly coupling the outlet conduit to the exhaust conduit,
    wherein the valve is positioned within the recirculation tube and configured to selectively open to communicate a portion of an outlet conduit exhaust gas from the outlet conduit to the exhaust conduit, and wherein the heat exchanger is operably coupled to the recirculation tube, the heat exchanger configured to cool the portion of the outlet conduit exhaust gas and output the cooled portion of the outlet conduit exhaust gas as the first gas.

7. The aftertreatment system of claim 1, further comprising:
    one or more temperature sensors configured to measure the selective catalytic reduction system temperature and generate a temperature signal indicative thereof,
    wherein the controller is operably coupled to the one or more temperature sensors and configured to receive the temperature signal.

8. The aftertreatment system of claim 7,
    wherein the one or more temperature sensors comprise a first temperature sensor positioned upstream of the selective catalytic reduction system and configured to measure a selective catalytic reduction system inlet temperature, and a second temperature sensor positioned downstream of the selective catalytic reduction system and configured to measure a selective catalytic reduction system outlet temperature, and
    wherein the selective catalytic reduction system temperature comprises a weighted average of the selective catalytic reduction system inlet temperature and the selective catalytic reduction system outlet temperature.

9. The aftertreatment system of claim 1, further comprising:
    a reductant insertion assembly configured to insert a reductant into the selective catalytic reduction system.

10. A method of maintaining a temperature of a selective catalytic reduction system receiving an exhaust gas from a diesel engine, the method comprising:
    providing the aftertreatment system of claim 1;
    determining the selective catalytic reduction system temperature of the selective catalytic reduction system;
    in response to the selective catalytic reduction system temperature being less than the target temperature, inserting hydrocarbons into the exhaust gas using the hydrocarbon insertion assembly, thereby increasing the selective catalytic reduction system temperature; and
    in response to the selective catalytic reduction system temperature being greater than the target temperature, instructing the valve to open so as to insert the first gas, which has a temperature lower than the selective catalytic reduction system temperature, into the exhaust gas, thereby decreasing the selective catalytic reduction system temperature.

11. The method of claim 10, wherein the target temperature is in a range of 250-450° C.

12. The method of claim 10, wherein a diesel oxidation catalyst is positioned upstream of the selective catalytic reduction system, and wherein the hydrocarbons are inserted into the diesel oxidation catalyst or upstream of the diesel oxidation catalyst.

13. The method of claim 10, wherein the first gas comprises at least one of air or a cooled portion of the exhaust gas.

14. The method of claim 10, further comprising:
before inserting the first gas, cooling the first gas.

15. The method of claim 14, further comprising:
recirculating a portion of an outlet conduit exhaust gas from downstream of the selective catalytic reduction system to upstream thereof as the first gas.

* * * * *